(12) United States Patent
Kinser et al.

(10) Patent No.: US 7,363,577 B2
(45) Date of Patent: Apr. 22, 2008

(54) TECHNIQUES FOR SERIALIZING EVENTS

(75) Inventors: Stephen Hugh Kinser, Spanish Fork, UT (US); Lloyd Leon Burch, Payson, UT (US); Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 935 days.

(21) Appl. No.: 10/848,343

(22) Filed: May 18, 2004

(65) Prior Publication Data

US 2005/0259776 A1 Nov. 24, 2005

(51) Int. Cl.
*G06F 17/00* (2006.01)

(52) U.S. Cl. ............... 715/234; 715/236; 715/237; 715/239

(58) Field of Classification Search ........... 715/234, 715/236, 237, 239
See application file for complete search history.

(56) References Cited

U.S. PATENT DOCUMENTS

| | | | | |
|---|---|---|---|---|
| 5,909,570 | A | 6/1999 | Webber | 395/500 |
| 5,974,371 | A | 10/1999 | Hirai et al. | 704/2 |
| 6,167,448 | A * | 12/2000 | Hemphill et al. | 709/224 |
| 6,295,561 | B1 | 9/2001 | Nagy | 709/246 |
| 6,363,337 | B1 | 3/2002 | Amith | 704/7 |
| 6,507,874 | B1 | 1/2003 | Tuniman et al. | 709/247 |
| 6,565,609 | B1 | 5/2003 | Sorge et al. | 715/503 |
| 2003/0144849 | A1 | 7/2003 | Kakivaya | |
| 2003/0172348 | A1* | 9/2003 | Fry et al. | 715/513 |
| 2005/0091589 | A1* | 4/2005 | Ramarao | 715/522 |
| 2005/0289558 | A1* | 12/2005 | Illowsky et al. | 719/318 |

FOREIGN PATENT DOCUMENTS

EP 0537098 A2 4/1993
EP 0642077 A1 9/1993

OTHER PUBLICATIONS

Cambell, Charles E, "XML Schema", SIGMOD Record, vol. 32, No. 2, Jun. 2003.*
Beauchemin, Bob, Essential ADO.NET, May 28, 2002, Addison Wesley Professional, Section 8.1.1.*
Jervis, Michael, "XML DTDs Vs XML Schema" Nov. 26, 2002 http://www.sitepoint.com/print/xml-dtds-xml-schema.*
"European Search Report for Application No. EP 05 10 4068, date mailed Oct. 11, 2005", 5 Pages.

(Continued)

*Primary Examiner*—Stephen Hong
*Assistant Examiner*—Adam Queler
(74) *Attorney, Agent, or Firm*—Schwegman, Lundberg & Woessner, P.A.

(57) ABSTRACT

Techniques are provided for serializing events of a data stream. Meta information defines information unit separators and context for events within the data stream. The data stream is parsed according to the instructions of the meta information and event data associated with the events of the data stream are retained. The event data is packaged into selective groupings of event data and transmitted to one or more services in data formats used by the services. The services perform one or more actions based on the received selective groupings of event data.

6 Claims, 3 Drawing Sheets

OTHER PUBLICATIONS

"FISD XML Messaging Specification for Real Time Streaming XML-Encoded Market Data", *OASIS Coverpages*, http://xml.coverpages.org/ni2003-12-19-a.html, (Archived Jan. 8, 2004), 4 Pages.

"Package gnu.xml.pipeline", http://xmlconf.sourceforge.net/java/apidoc/gnu/xml/pipeline/package-summary.html, (archived Aug. 28, 2001), 4 Pages.

Avila-Campillo, Iiana, et al., "XMLTK: An XML Toolkit for Scalable XML Stream Processing", Proc. Plan-X Workshop on Programming Language Technologies for XML Pittsburgh PA USA, (Oct. 3, 2002),1-10.

Morgenthal, J. P., "Enterprise Application Intergration Tutorial", *OMG EAI WORKSHOP*, http://www.omg.org/news/meetings/workshops/presentations/eai_presentations2/2000207_omgtutorial.pdf.2/7/00, (Observed Sep. 19, 2005), 30 Pages.

\* cited by examiner

TECHNIQUES FOR SERIALIZING EVENTS

FIELD OF THE INVENTION

The invention relates generally to data processing, and more specifically to techniques for assembling and serializing events from data streams.

BACKGROUND OF THE INVENTION

A wide variety of data is collected or captured in electronic media. Unfortunately, the practical use of that data is often limited by the data's native stored format. That is, the ability to consume or take action based on captured electronic data is determined by another service's ability to recognize or properly translate the data's format into other formats which the service can process. In many instances captured electronic data exists in proprietary or unique data formats which are produced by another service as output. Thus, if there is a desire to integrate the captured electronic data with consuming services, the data format of the captured electronic data must be translated for the consuming services.

This particular problem is most noticeable with captured log information associated with a processing service. Log files are rich with information about activities of a processing service (e.g., identity information, time information, resource information, task performance information, etc.) and events (e.g., failures, access attempts, etc.). Moreover, log files are often manually inspected or automatically inspected with batch processing services that are designed to recognize and process the data formats of specific log files.

Yet, batch processing is not an optimal solution because separate batch services are needed for each unique log file data format. This means that a myriad of batch services can rapidly proliferate within an enterprise, with each requiring maintenance and support. Additionally, if a particular batch service is designed to interface with another service based on evaluation of a log file's contents that batch service will need to be modified if a different service requires integration with the log file's contents. Accordingly, upgrades and enhancements are regularly made to batch files as new services are integrated with a log file's contents.

The problem is not limited to log files, because there are a variety of situations where an enterprise could profitably benefit from automatically harvesting and integrating output from one service with another service. For example, a financial service's (e.g., banking transactions, stock transactions, etc.) output could be automatically consumed by an alerting service (e.g., instant messaging (IM), electronic mail (email), etc.) in situations where the output is deemed significant enough to warrant some processing by the alerting service.

In many instances, the significance of output is determined when it is associated with an event, and based on the presence of that event some action is desired by another service (e.g., alerting service emails a business auditor). However, in many circumstances, a single event and its associated data from a data stream may depend upon other events and their data included elsewhere within the data stream. Thus, there is a need not only to translate events to different data formats but to also package or group detected events within data streams for integration with consuming services.

Accordingly, techniques are needed for improved serialization of events detected within data streams.

SUMMARY OF THE INVENTION

In various embodiments of the invention, techniques are presented for serializing events of a data stream. Meta information defines how the data stream is to be processed in order to acquire the events and their event data from the data stream. Detected events and event data are selectively grouped, translated into desired formats, and transmitted to services. The services perform one or more actions based on the received selective groupings of event data.

More specifically, and in one embodiment, a method for serializing events of a data stream is provided. Meta information which defines a data stream is received. The data stream is evaluated using the meta information to detect events within the data stream. The detected events are serialized into one or more desired data formats.

DETAILED DESCRIPTION OF THE INVENTION

Figure 1:
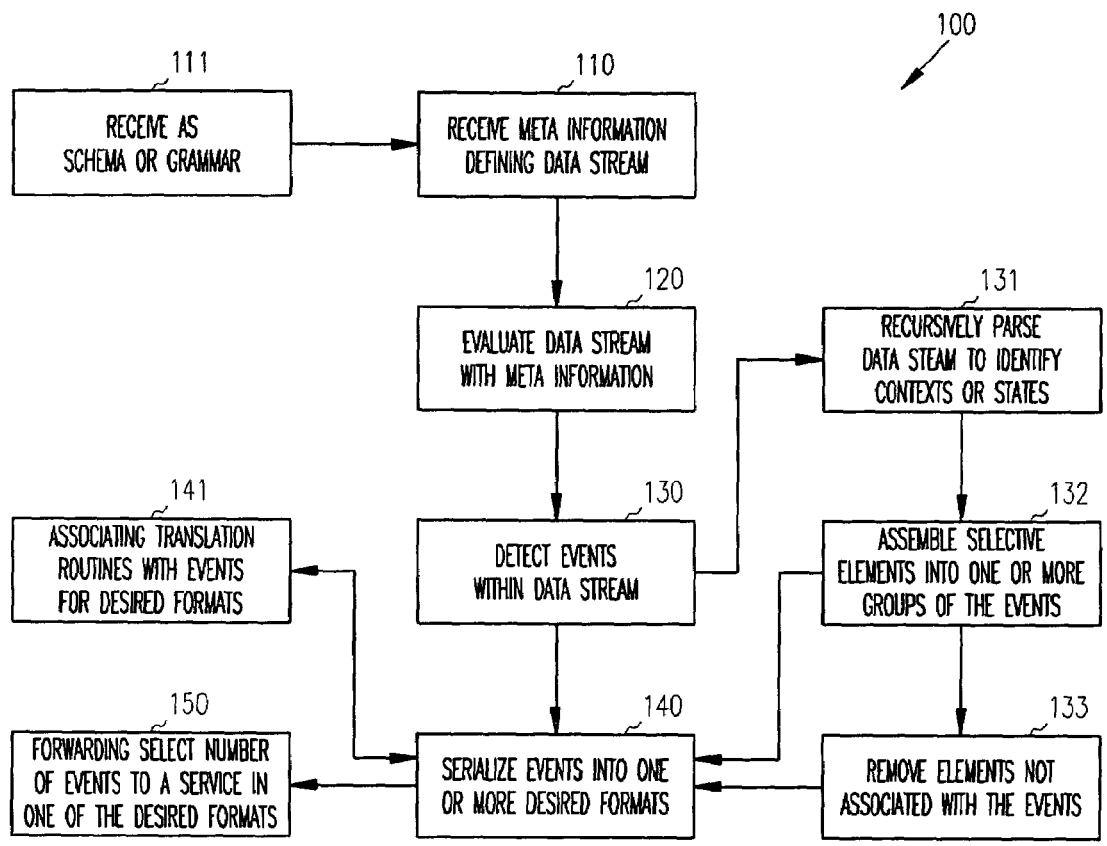
FIG. 1 is a flowchart representing a method for serializing events of a data stream, according to an embodiment of the invention.

In various embodiments of the invention, the term "data stream" is used. A data stream is output produced from a service during processing. In one particular embodiment, the data stream is data that the service does not directly intend to be provided to another consuming service for consumption, such as log information or historical information. In another embodiment, the data stream is data that a service typically generates as output and in some cases expects that the data will be consumed in some manner by another service. The data stream can be in any marked-up language (e.g., Hyper Text Transfer Protocol (HTTP), Standard Generalized Markup Language (SGML), Extensible Markup Language (XML), custom developed or proprietary markup language, etc.). Additionally, in other embodiments, the data stream is in no pre-defined markup format (e.g., text with white-space delimiters, comma delimiters, line-feed delimiters, field based, etc.).

An information unit separator, is an electronic piece of data (e.g., white space, token, constant string, etc.), pattern, or rule that can be used to identify information units within a data stream. Information units are low-level pieces of data that combine in various contexts and combinations to form elements. Elements identify structural types of information within the data stream. Elements can also include attributes, and both elements and attributes may or may not include enumerated values that can be associated with the elements and attributes. Additionally, elements and attributes can be associated with facets and/or specific patterns within the data stream. The definitions which define the elements, attributes, types, facets, enumerations, and patterns combine to form meta information about the structure of the data stream.

Meta information defines the structure of the data stream in meta language syntaxes. In one embodiment, the meta information is a Database Definition Language (DDL) for a database table. In another embodiment, the meta information is an XML schema definition (XSD). In yet another embodiment, the meta information is a document template (e.g., word processing, spreadsheet, presentation, etc.). In still other embodiments, the meta information is a context-sensitive grammar. The syntax of the meta information conforms to a particular meta language (e.g., markup language, programming syntax, formal representation, etc.). Instances of the meta information define the structure of a particular data stream and its events.

Events are types of data detected within the data stream that warrant some action. Events can be configured based on analysis of the particular data stream and the consuming services available to perform actions. However, events need not be specifically mapped to a particular consuming service; rather, an event is generically defined within the meta information and subsequently translated into specific events recognized by one or more consuming services. Thus, a single instance of meta information can be used to define a generic event within a particular data stream and that generic event can be subsequently translated into one or more specific events destined for one or more consuming services. Those consuming services perform some action based on the specific events provided to them.

Generic events can be translated into specific events by using one or more translation routines associated with specific consuming services. In one embodiment, these translation routines can also be referenced within the meta information, such as with Extensible Style Sheets Language Transform (XSLT) routines. A single generic event can include one to many different XSLT routine references within any given instance of the meta information.

In various embodiments, the term "serialization" is used. This term refers to the ability to assemble, package, and translate one or more groups of events detected within a data stream for delivery to one or more consuming services. That is, events detected are not simply detected and transmitted; rather, in one embodiment, events are detected and retained until the entire data stream is processed using the meta information, upon which the events are assembled and translated (packaged) for delivery to one or more desired consuming services for further action. In other embodiments, events are specifically released when the meta information indicates that certain retained events are to be released. That is, the meta information can control when events are released. In still another embodiment, an event-bus Application Programming Interface (API) of Java Messaging Service (JMS) interface is deployed with the teachings herein. Here, detected events are published and subscribing services, which are subscribed to the topics or categories associated with the published events, receive notice of detected events.

In one embodiment, the techniques presented herein are incorporated into the DirXML product distributed by Novell, Inc. of Provo, Utah. In another embodiment, the techniques presented herein are implemented as extension to existing meta language specifications (e.g., XML, etc.), meta language parsers, or other meta language processing products. Of course the invention is not limited to the above provided examples, since the techniques presented herein can be implemented in any standalone or modified product designed to serialize events from data streams in the manners presented.

FIG. 1 is a flowchart representing one method 100 for serializing events of a data stream. The method 100 is implemented as one or more applications or services which reside in a machine-accessible medium and is optionally accessible over a network. In one embodiment, the method 100 is implemented as a serializing service that interfaces with meta information and a parser for purposes of processing a data stream. In another embodiment, the method 100 is implemented as an enhanced and intelligent parser service which consumes the meta information and processes the data stream.

Initially, a specific instance of meta information for a data stream is developed and available. At 110, that meta information is received and it defines a data stream in terms of its information unit separators, events, and contexts or states. In one embodiment, at 111, the meta information is received as a schema (e.g., DDL, XML, etc.) or as a context-sensitive grammar.

The events are configurable and defined for a developed instance of the meta information. Some events are generic, meaning that any one generic event may translate into a series of other specific events recognized by consuming services or meaning that any grouping of events may combine to translate into a specific single event recognized by consuming services. The meta information may also instruct that certain portions of the data stream be included with or in the particular events.

The meta information can define the context or states in which events are detected within the data stream. What this means is that often a specific piece of information (information unit) within the data stream may need to be resolved within a particular context. That is, some times the prior or subsequent occurrence of one or more other information units within the data stream assist in resolving whether a particular identified information unit is an event.

For example, suppose the data stream is a log file of a financial service (e.g., stock trading) and that the service processes the log data within that log file sequentially. If the service encounters a user that accesses a stock trading function, then the service records the name of the user, the name of the function, and the time of day. That user may proceed to perform a variety of actions within the stock trading function before the user issues an actual buy or sell order for a particular stock. The information unit associated with the buy or sell order may occur in the log file many records after the financial service recorded that it was in the trading function. Thus, the event associated with buying or selling is context sensitive. Of course a more complicated situation can occur, such that the event is logged before the context is fully resolved or the event is nested within other sub-contexts or states within the log file.

In some embodiments, some events are not context sensitive or state specific. This means that the resolution of some events can be resolved sequentially as the data stream is processed using the meta information.

At 120, the data stream is evaluated using the instructions defined in the meta information. The meta information serves to validate that the data stream conforms to a certain predefined syntax (information unit separators) and semantic structure (elements, attributes, types, facets, enumerations, and/or patterns). Should the data stream not conform to the defined syntax and semantic structure, an error is generated requiring the meta information to be properly identified to account for the error condition.

The data stream can be directly sent from a producing service to the processing of the method 100 or alternatively the data stream can be stored in a file and processed after a certain amount of configurable time, after a configurable amount of data is acquired, or after the producing service finishes processing (e.g., based on a configured event).

The evaluation is used for serially processing the data stream with the meta information in order to detect events at 130. This entails parsing the data stream using the syntax and semantic structure of the data stream which is defined in the meta information. In one embodiment, at 131, the parsing can recursively occur in order to perform multiple layers of state or context sensitivity resolution. At the conclusion of any recursion, the processing results are popped off a stack and associated with a proper context or state. Thus, at 132, selective elements or information units are assembled or associated with one another into one or more groups of events. In some embodiments, at 133, any elements or information units not associated with events which are detected in the data stream are removed from further processing.

At 140, the detected events are serialized. This means related or dependent events and event data are grouped together and translated into desired data formats which are recognized by one or more consuming services. In many cases, a consuming service, which is the target of the events, may not be able to serially receive events as the processing of the method 100 detects the events sequentially within the data stream. For example, suppose the event is a database update, in order for the consuming database service to perform an update it may need to have a variety of information, such as type of action (e.g., read or write), name of database table, name of database field, and data to store if a write action is occurring.

In other instances, several grouped events may be associated with actions that the processing of method 100 (hereinafter referred to as "processing") wants to control, where those actions need to occur in a certain predefined order. For example, the processing wants a database service to update a database and send a notification to a specific resource. The request for notification will make no sense to the data base service until after the update occurs. Alternatively, the grouped events can be associated with different consuming services. For example, the processing may want to update a database using a database service and after that send an IM or email to a messaging service for processing.

In some embodiments, at 141, the translation to desired data formats is achieved through translation routines. In one embodiment, the translation can appear as XSLT routine references within an XSD, which is the meta information. In this way, a specific instance of the meta information entirely drives the processing of the method 100 in an automated fashion. The processing performs different translations based on different instances of the meta information. This provides unique benefits in that a single generic meta language can be used to define different instances of the meta information and a single processing instance of the method 100 can serialize events in different data streams associated with different instances of the meta information. Essentially, data streams are dynamically harvested and integrated with desired consuming services using the meta information and the processing.

At 150, a select number of the events and/or groupings are forwarded to one or more consuming services in data formats recognized by those consuming services. A consuming service can be any existing or yet undeveloped service. The consuming service does not need to be aware of the processing of the method 100. The processing puts events and their event data in formats that the consuming services understand, which instruct the consuming services to perform one or more actions. This is similar to invoking the consuming service with parameter information, that parameter information is in a format and order which the consuming service recognizes and includes the events and their event data. Of course, a particular consuming service may receive data from files or database fields; in these instances the processing can create such files or database fields.

Additionally, the producing service that produces the original data stream need not be aware of or interfaced to the processing of the method 100. The producing service simply generates messages, data, or log files in manners that it was originally designed to do. An analyst evaluates the context and syntax of those data streams and generates an instance of meta information using a meta language. One or more translation routines are associated with appropriate pieces of the meta information and the processing of the method 100 initiated. Neither the producing nor consuming services are aware of the processing. Yet, both services are seamlessly interfaced to one another vis-à-vis the meta information and the processing.

In one embodiment, the processing uses information unit separators defined with specific data (e.g., character delimiters), patterns, or rules (e.g., grammar definitions) in the meta information to identify information units included within the data stream. These information units are then assembled and associated with higher level constructs, such as elements or attributes. Any particular element or attribute can take on different types of data (e.g., character, punctuation, numeric, integer, floating, etc.). Moreover, any particular value for an element or attribute included within the data stream can be associated with a specific range of enumerated values. Further, the elements or attributes can be defined by facets and patterns. The rules associated with the information unit separators, elements, attributes, types, facets, enumerations, and patterns are defined in the meta information using a meta language.

In some embodiments, the processing utilizes a conventional parser to return the elements defined in the data stream given the meta information. These elements are then held and assembled into groups of associated elements. Thus, with some embodiments, any parser can be used to assist in the serialization process.

Additionally, in one embodiment, the processing produces an intermediate data stream from the original data stream. The intermediate data stream is tokenized with the generically defined and detected elements. This may be useful in serializing events for multiple data streams as a single serialized data stream which is forwarded to a consuming service. That is, the processing can perform tokenization on one data stream and then process a different data stream and use the detected events in both data streams to properly serialize events to a consuming service. Tokenizing data streams may also prove benefit in later mining a variety of data streams. That is, tokenized data streams from a plurality of different producing services can be housed and a mining service developed for evaluating the data streams vis-à-vis one another. Therefore, in some embodiments, the received data stream at 100 may be a prior processed and/or tokenized data stream.

Figure 2:
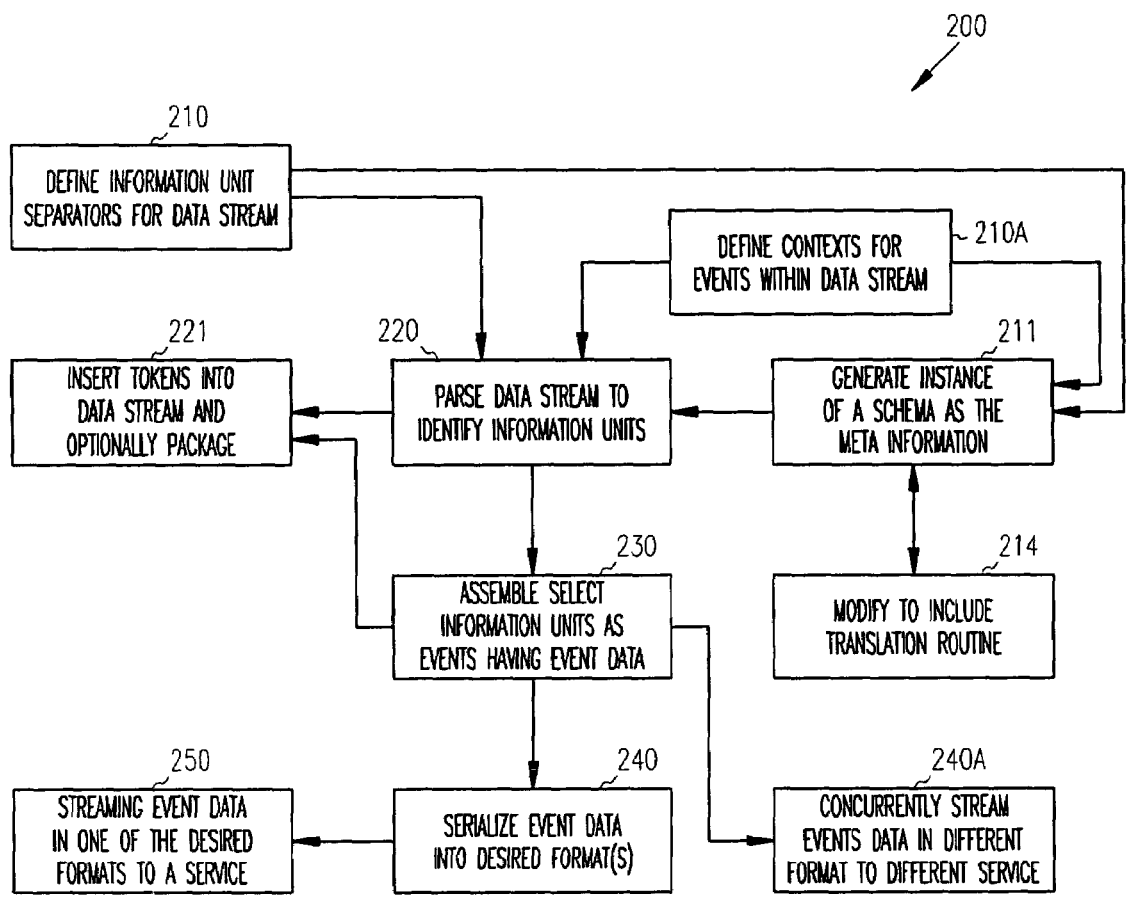
FIG. 2 is a flowchart representing another method for serializing events of a data stream, according to an embodiment of the invention.

FIG. 2 is a flowchart of another method 200 for serializing events of a data stream. The method 200 is implemented in a machine-accessible and readable medium and is optionally accessible over a network. The method 200 detects and assembles events from a data stream of a producing service and packages those events and their data for delivery to one or more consuming services in data formats used by those consuming services.

Initially, information unit separators, at 210, and contexts for derivable events, at 210A, within the structure of a data stream are expressed and defined using a meta language. Information separators are defined as data constant strings, patterns, or rules associated with acquiring or detecting pieces of discrete information (information units) within the data stream. For example, a particular producing service may produce output to a log file. The output may be in a text format that is separated by commas. In this instance, the comma represents an information unit separator. Events and their contexts are defined by identifying rules associated with detecting elements and attributes and their associated types, facets, enumerations, and/or patterns. In one embodiment, the meta language is an XML or SGML language specification. In another embodiment, the meta language is a language specification for a context-sensitive grammar language.

In an embodiment, at 211, the definitions of the information unit separators, events and their contexts are used for generating an instance of a schema, which represents meta information (similar to what was described above in detail with method 100 and FIG. 1). That schema can be a DDL for a database table, a document template, or an XSD. At 212, the schema may also incorporate translations routine (e.g., XSLT) references with various defined elements and attributes of the schema. These translation routines convert, transform, or render detected events (selective elements or attributes) from a native data format to a specific data format.

The data stream is parsed, at 220, using the definitions (meta information or schema definitions) for the information unit separators, events and their contexts for purposes of identifying discrete information units included within the data stream. These information units are organized as elements and attributes having one or more types, facets, enumerations, and/or patterns. In some embodiments, the parsing, at 220, is recursive in order to properly detect the defined contexts and resolve the elements and attributes.

In one embodiment, at 221, the parsing inserts tokens or markup into the data stream to identify information units, elements, and attributes. This tokenized data stream can be fed back into the process at 210 and 210A and again recursively processed. Moreover, in some embodiments, the tokenized string can be housed in a file or data store for subsequent mining vis-à-vis other different data streams. That is, data stream tokenization serves as a normalization of the original data stream's format and makes subsequent processing of that tokenized data stream easier to interpret, mine, or integrate with other services.

At 230, the information units detected by the parsing are assembled as events based on detected elements and attributes identified by the parsing for selective information units. These events include event data. That is, an event is a label used by the processing for a particular type of event, the event data is the data actually appearing in the parsed data stream for that label. A single data stream may have multiple occurring events of the same type, where each event includes unique event data. The actual label need not occur in the data stream, although it may if the data stream was tokenized, at 221. In many instances the parsing, at 220, passes data to 230 along with a label indicating its element or attribute type. At 230, those element and attribute labels are assembled into event types and the associated data represented as event data. Moreover, at 230, and in one embodiment, any tokenized data stream, at 221, can be augmented with event defined labels or tokens.

Once events of a data stream are detected, they are held in abeyance until the entire data stream is parsed and all events and their event data acquired. Alternatively, events are held until metadata (definitions or meta information about the events) instruct that it is appropriate to release particular events. At this point, at 240, the event data can be serialized (packaged, grouped, and translated) from its native data format into one or more desired data formats and streamed, transmitted, or sent to a consuming service for action at 250. In some embodiments, at 240A, the same event data can be serialized in an entirely different data format and concurrently sent to an entirely different consuming service for an entirely different action.

The serialization at 240 and 240A can use translation routines for determining how to convert the native data format of the event data into data formats which can be processed by the consuming services. Additionally, the serialization at 240 and 240A resolves dependencies between events, such that selective groupings of events and their event data are streamed, transmitted, or sent to the consuming services together and in an appropriate order or sequence.

Figure 3:
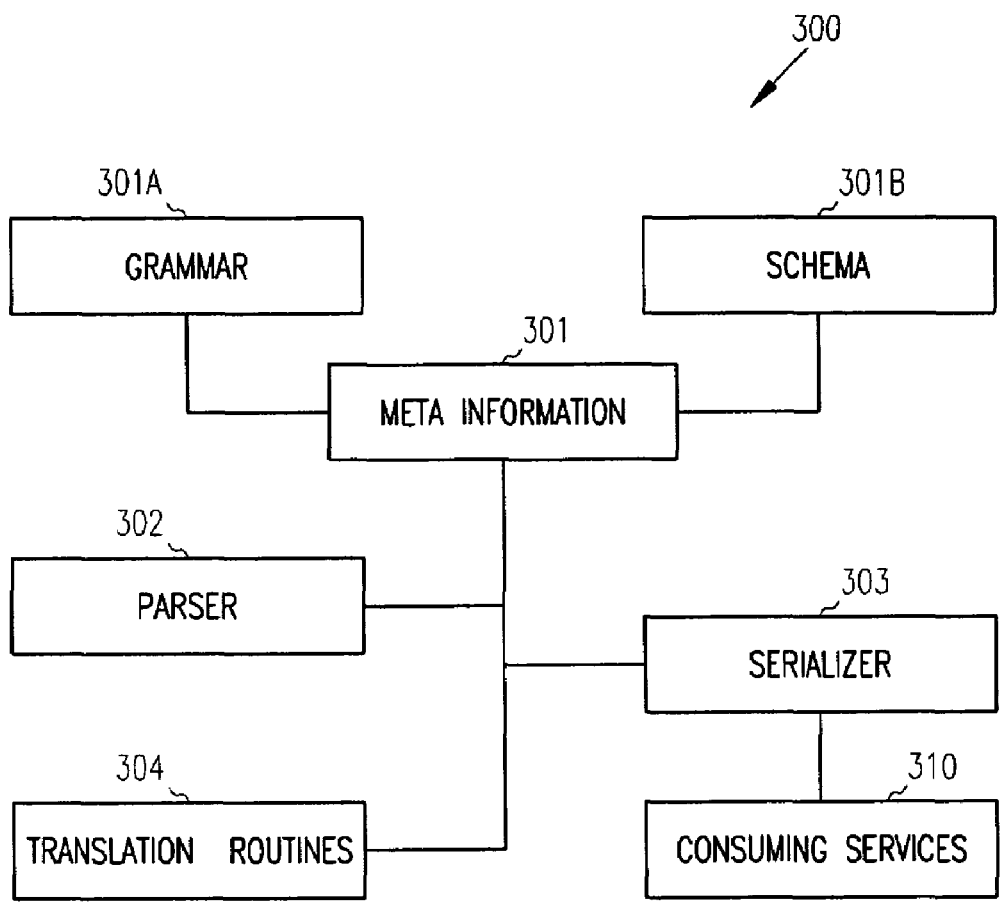
FIG. 3 is a diagram of an event serialization system, according to an embodiment of the invention.

FIG. 3 is a diagram of an event serialization system 300. The event serialization system 300 is implemented in a machine-accessible and readable medium and is optionally available over a network. In one embodiment, the event serialization system 300 implements methods 100 and 200 of FIGS. 1 and 2, respectively.

The event serialization system 300 minimally includes meta information 301, a parser 302, and a serializer 303. In other embodiments, the event serialization system 300 includes one or more translation routines 304.

The meta information 301 is expressed in a syntax that conforms to a meta language specification. In one embodiment, that meta language specification is an extension to the XML specification to include event serialization according to the teachings presented herein. The meta information 301 can be a grammar 301A or a schema 301B, such as an XSD or DDL.

The parser 302 can be custom developed for purposes of implementing the teachings presented herein. Alternatively, the parser 302 can be an existing XML parser, in situations where the meta information 301 is an XSD 301B.

In one embodiment, the meta information 301 is an XSD and the XSD includes references for elements and attributes that identify one or more of the translation routines as XSLT routines. The parser 302 and/or serializer 303 invoke the XSLT routines via the XSD references to translate event data from a native format to desired format for a consuming service 310.

The meta information 301 defines information unit separators, events, and the contexts of events as they appear in a data stream. In one embodiment, the data stream is any log file produced from a producing service. In another embodiment, the data stream is any output (buffered or streamed) generated from the producing service. An instance of the meta information 301 defines a particular data stream for a particular producing service. However, the syntax and rules associated with meta information 301 instances are consistent. That is, the meta language specification used for producing instances of the meta information 301 is the same.

The parser 302 consumes the data stream and an instance of the meta information 301, which defines that data stream. The meta information 301 permits the parser to decompose and recognize elements and attributes included within the data stream according to the contexts (rules) of the meta information 301. The identity of these elements and attributes and their corresponding data are passed to the serializer 303.

The serializer 303 identifies selective groupings of the elements or attributes as events having event data. To do this, the serializer 303 waits until the parser 302 has completely processed the entire data stream using the meta information 301. Alternatively, the serializer waits until instructions associated with the meta information 301 indicate that event data or groupings thereof should be released. In some instances, the parser 302 may recursively process the data stream in order to properly recognize the defined contexts. In an alternative embodiment, the parser 302 assembles the elements and attributes as elements, and the serializer groups the received events and event data into packages for deliver to one or more consuming services 310.

Once the serializer 303 has all the labels for elements and attributes and their corresponding data as it appeared in the data stream, the serializer groups one or more elements and attributes and their data together to form one or more generically defined events from the meta information 301. The groupings may be order or unordered (appear as they were sequentially identified). The serializer 303 then translates the event data into desired formats used by one or more consuming services 310. In one embodiment, the translations are acquired from one or more translation routines 304.

The serializer 303 then sends, transmits, or streams the event data groupings to the desired consuming services 310. The consuming services 310 recognize the event data groupings as events or commands to perform one or more actions, and the consuming services 310 perform the corresponding actions based on the received event data groupings.

The consuming services 310 need not be aware of the serializer 303, such that the event serialization system 300 can integrate into legacy (existing) consuming services and with future developed consuming services 310. In a like manner, the producing services which generate the data stream need not be aware of or be modified to interface with the event serialization system 300. Thus, the event serialization system 300 can be easily and seamless integrated into existing architectures and future architectures by generating an instance of meta information 301 for a producing service's output (data stream), producing a translation routine for a consuming service 310 (if not already available and desired), and processing the parser 302 in cooperation with the serializer 303 against a data stream (output) using the meta information 301 instance.

Figure 4:
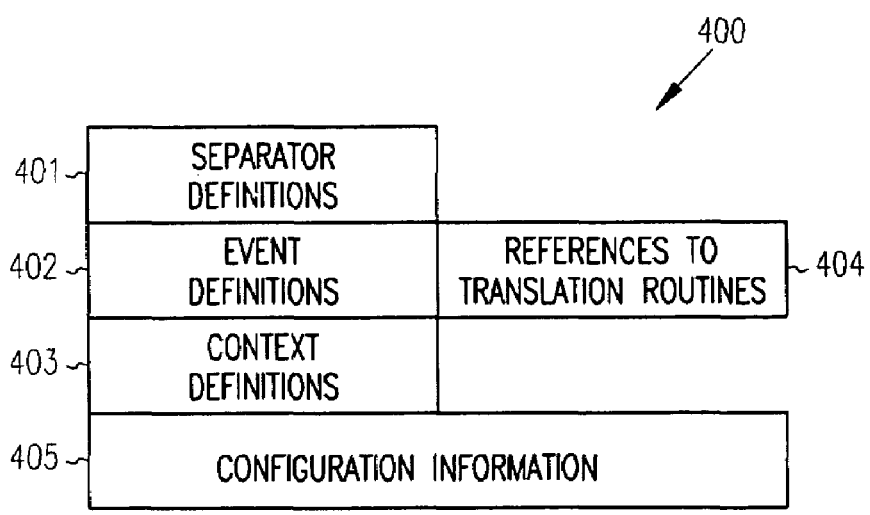
FIG. 4 is a diagram representing meta information that assists in serializing events of a data stream, according to an embodiment of the invention.

FIG. 4 is a diagram of meta information 400 implemented in a machine readable and accessible medium. The meta information 400 is used for defining serialized events. In one embodiment, the meta information 400 is consumed by the methods 100 and 200 and the event serialization system 300 of FIGS. 1-3, respectively. The meta information 400 conforms to a meta language formal specification, such as XML, SGML, a grammar language, and the like.

The meta information 400 minimally includes information unit separator definitions 401, event definitions 402, and context definitions or rules 403 for a data stream. In some embodiments, the meta information 400 can also include references to translation routines 404 that permit other processing services to translate detected event data from a native format of the data stream into one or more desired formats. A consuming service uses the translated event data for performing one or more actions. In yet another embodiment, the meta information can include configuration information 405 which a generating service uses to generate an instance of the meta information 400 having specific separator definitions 401, event definitions 402, context definitions, and optionally translation references 404.

The separator definitions 401 are data string constants, patterns, or rules which define how information units are detected within a particular data stream. Information units combine in combinations to form events; these combinations are expressed in the event definitions 402 and context definitions 403. The event definitions 402 include combinations of elements or attributes. Each element or attribute can be associated with types, facets, enumerations, and patterns.

The definitions 401-403 conform to a meta language specification. In one embodiment, that specification is XML or a formal context-sensitive grammar (e.g., Backus-Naur Form (BNF), etc.). In an embodiment, the meta information 400 is represented as an XSD. That XSD includes references to XSLT routines 404. The XSLT routine references permit a consuming service to transform, render, convert, or translate event data associated with a detected event in a data stream from a native data format to a different data format.

Specific populated instances of the meta information 400 provide instructions to other services, such as a parser 302 and serializer 303 (FIG. 3 above) which cooperate, for validating, decomposing, and assembling information units of a data stream into one or more events and their associated event data. The events are generically defined and their event data can be translated or rendered to different data formats for purposes of requesting a consuming service to perform some action based on the translated event data. The meta information 400 acts as a roadmap or formal instruction for interfacing events produced by a producing service to one or more consuming services. The producing service and consuming services need not be aware of one another and need not be originally capable of being interfaced with one another.

In some embodiments, instances of the meta information 400 can be automatically and dynamically generated based on configuration information 405. That is, the configuration information 405 permits a generating service to use data values included within the configuration information 405 for purposes of generating one or more specific instances of the definitions 401-403 according to a meta language. Each specific instance defines processing for a unique data stream. In some embodiments, the configuration information 405 can also be automatically selected from a collection of configuration information. That selection may be based on the identity of a known format for a given data stream or based on an identity of a known producing service that produces a data stream.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. § 1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method for serializing events, comprising: defining information unit separators associated with a data stream using meta language definitions; defining contexts and events using the meta language definitions; parsing the data stream for uniquely identifying information units within the contexts using the defined information unit separators and contexts; assembling from the data stream a number of the information units into one or more of the events having event data; serializing the event data into one or more desired formats; wherein the method further comprises generating an instance of a schema or a grammar which includes the defined information unit separators, contexts, and events; and modifying the schema or the grammar to include translation routines for translating the data associated with the events into the one or more desired formats.

2. The method of claim 1 further comprising, streaming the event data in one of the desired formats to a service for processing.

3. The method of claim 2 further comprising, concurrently streaming the event data in a different one of the desired formats to a different service for concurrent processing.

4. The method of claim 1, wherein defining the information unit separators, the contexts, and the events further includes using extensible markup language (XML) as the meta language.

5. The method of claim 1, wherein parsing further includes inserting tokens around the data included in the data stream during the parsing of the data stream.

6. The method of claim 5, wherein assembling further includes packaging select numbers of the events based on identities of the tokens and the contexts.

* * * * *